E. H. FORD.
MACHINE FOR TESTING WATER METERS.
APPLICATION FILED AUG. 12, 1914.
1,167,392.
Patented Jan. 11, 1916.
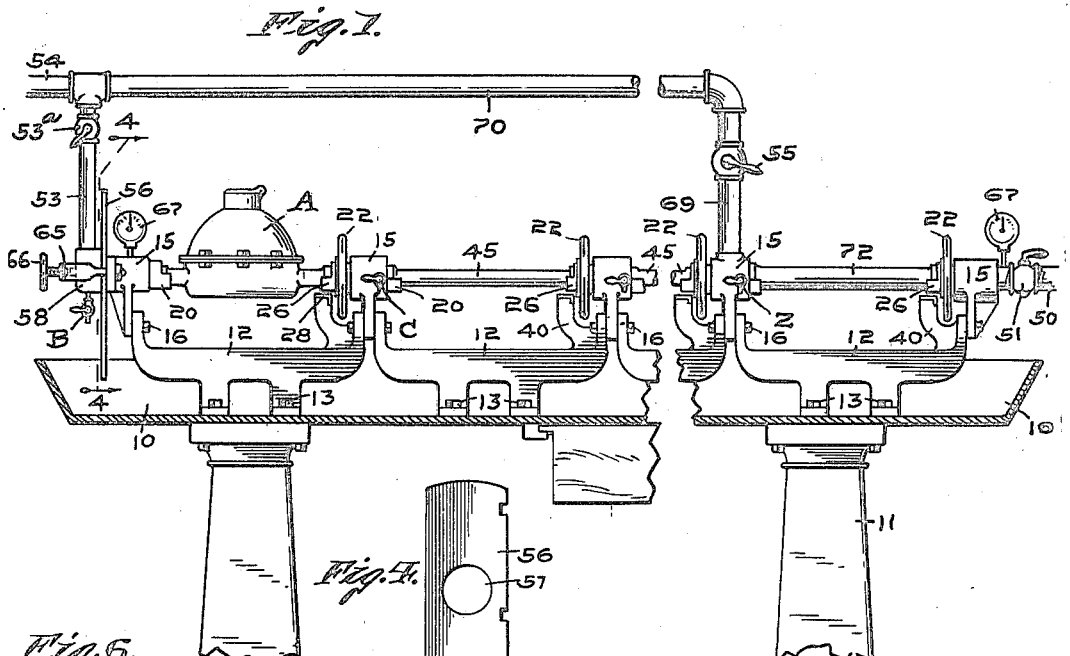
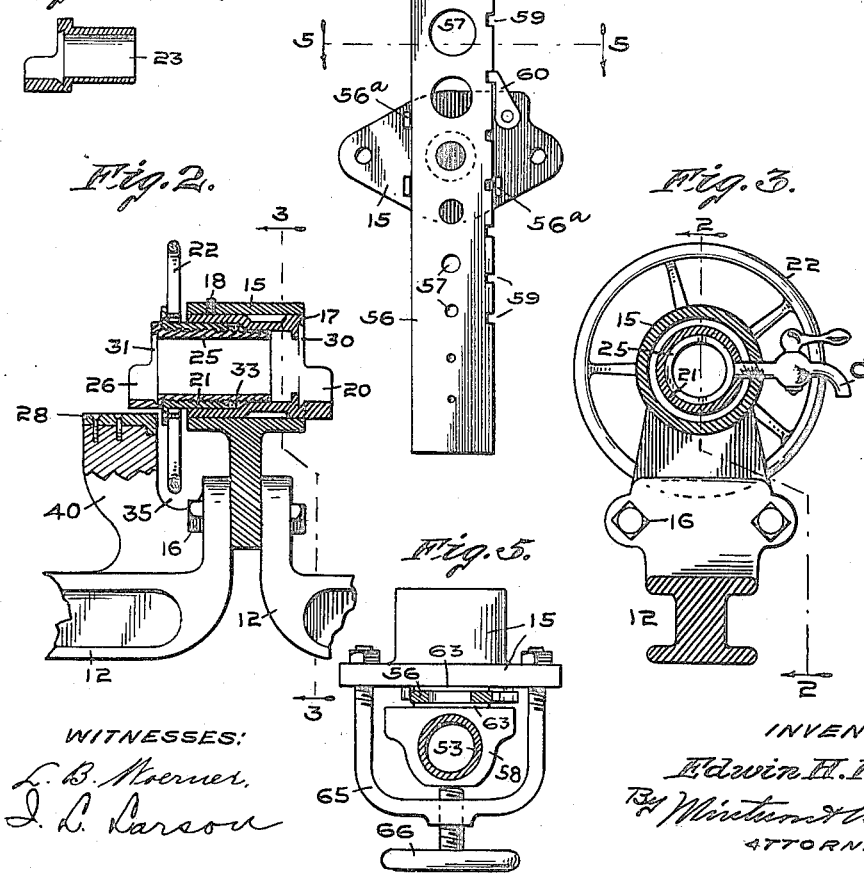
WITNESSES:
INVENTOR
Edwin H. Ford,
By Winter & Woerner,
ATTORNEYS.

UNITED STATES PATENT OFFICE.

EDWIN H. FORD, OF WABASH, INDIANA.

MACHINE FOR TESTING WATER-METERS.

1,167,392. Specification of Letters Patent. Patented Jan. 11, 1916.

Application filed August 12, 1914. Serial No. 856,350.

*To all whom it may concern:*

Be it known that I, EDWIN H. FORD, a citizen of the United States, residing at Wabash, in the county of Wabash and State of Indiana, have invented certain new and useful Improvements in Machines for Testing Water-Meters, of which the following is a specification.

In water service companies which provide water for municipalities by the meter system, it is desirable to have a machine for periodically testing the meters for determining their accuracy in the measurement of water.

The object of this invention is to provide a machine which will be thoroughly practical and comparatively inexpensive by means of which water meters can be easily, rapidly and accurately tested.

A further object of the invention consists in the provision of a machine of the above character in which a large number of meters may be simultaneously tested, the machine contemplating a construction whereby each meter is confined independently within the machine with regard to the other meters, so that each meter can be removed and another replaced without disturbing the other meters which are being tested.

A further object of the invention consists in the provision of a machine of the above character in which water meters may be tested under various conditions by throttling down or enlarging the flow so that a smaller or larger volume of water can be passed through a meter in a given time under the same head.

I accomplish the above objects of the invention by means of the construction illustrated in the accompanying drawings, forming a part hereof, in which—

Figure 1 is a detail view which is partly in side elevation and partly in section of my improved meter testing machine. Fig. 2 is an enlarged detail sectional view of the means for clamping each meter to be tested in position, on the line 2—2 in Fig. 3. Fig. 3 is a cross section on the line 3—3 in Fig. 2. Fig. 4 is a view on the line 4—4 in Fig. 1, this view being on a considerably enlarged scale. Fig. 5 is a cross section on the line 5—5 in Fig. 4. Fig. 6 is a longitudinal section through one of the secondary pipe supporting sleeves.

Referring to the drawings, the frame of the machine contemplates a rectangular tank or trough 10 which is mounted on suitable pedestals or legs 11 and at such a height to enable the operator to proceed with the work in an erect position. The tank 10 is made of sufficient length to accommodate a number of meters to be tested at a time, and this tank provides a support for a plurality of U-shaped members 12 which are arranged in the same plane and are securely bolted to the bottom of the tank 10 by means of the bolts 13. The upturned ends of the U-shaped members 12 provide means for attaching the bearings 15 which are secured to the members 12 by means of the bolts 16. The bearings 15, as shown in Fig. 2, are hollow and liners 17, usually composed of brass, are inserted into the bearings 15 and are rigidly held in place by means of the pins 18. The liners 17 are provided with integrally formed lips 20 which receive and support one of the ends of the meters. Inserted into the ends of the liners 17, opposite the ends containing the lips 20, are interiorly threaded cylinders 21 to which revoluble hand-wheels 22 are secured in any suitable manner and by which means said cylinders 21 are rotated. Exteriorly threaded inner sleeves 25 screw into the interiorly threaded cylinders 21, and the sleeves 25 are provided with integrally formed lips 26 which receive and support one of the ends of the meters. By means of this construction it will be seen that when the hand-wheels 22 are revolved, and impeding the longitudinal travel of the cylinders 21 by the adjacent edges of the bearings 15 and the stop-plates 28, the inner sleeves 25 will be forced to travel longitudinally, either to clamp the meters tightly in position when they are to be tested or to release them. It will also be noted that the ends of the liners 17 and the inner sleeves 25 containing the lips 20 and 26, respectively, are provided with the recesses 30 and 31 which receive suitable gaskets so that water tight joints may be effected with the ends of the meters. Suitable packing 33 is also inserted at the inner ends of the cylinders 21 so that water tight joints at these points are effected. For mechanical reasons the outer ends of the cylinders 21 are provided with flanges to which the hand-wheels 22 are secured and in assembling these parts the hand-wheels 22 are first inserted into the notches 35 after which the cylinders 21 are placed in position. After the above operation is completed the inner sleeves are inserted. The stop-plates 28 are now placed in position upon the brackets 40 for limiting the longitudinal travel of the said sleeves in one direction, while the adjacent edges of the bearings 15 limit the longitudinal travel of said sleeves in the opposite direction.
It will be noted that with the use of my invention a water testing machine may be made sufficiently long to accommodate any desired number of meters at one time, in which each meter is individually clamped in position. As illustrated in Fig. 1, a single meter A may be tested on a machine which will accommodate a plurality of meters, and this is accomplished by providing a number of pipes 45, which are inserted into the places ordinarily used for testing meters, to establish and maintain free passage of the water through the machine. As about ninety-five per cent. of the meters in use are of the five-eighths inch variety, I provide the supporting sleeves 23, shown in Fig. 6, which are inserted into the sleeves 25 and liners 17 to accommodate meters of this character. When I desire to test three-fourths inch meters the supporting sleeves 23 are removed, allowing the lips 20 and 26, on the liners 17 and sleeves 25, respectively, to support meters of this character.

To extend the sphere of usefulness of my improved water meter testing machine to meet the varying conditions that obtain in large cities, where a limited number of meters of a full one-inch flow are tested, I provide the machine with one section capable of testing a full one-inch flow. The inlet pipe 50 is of one-inch diameter to supply sufficient water to accommodate meters taking a full one-inch flow, and the pipe 50 is provided with an ordinary cut-off valve 51 by which the water may be entirely cut out of the testing machine. When testing meters of less than one-inch flow, the water, after entering the pipe 50, passes through the several meters that are being tested, or, in case of testing a single meter, through the pipes 45, and passes out through the vertical pipe 53 and outlet pipe 54 which discharges into a weighing tank (not shown) where the water is weighed. Initially, the water is allowed to flow until all of the air has been exhausted from the meters, after which the valve 53$^a$ is closed to temporarily stop the flow of water. The registering dial on each meter is now examined to note the position of the indicator hands before the test is started, and in case said hands stand in positions to render subsequent computations easy the positions of the hands are tabulated. The valve 53$^a$ is now opened, allowing the water to pass out through the outlet pipe 54 for a determined period of time at the end of which the valve 53$^a$ is closed and the readings of the meters are again tabulated so that the amount of water that has passed through the meters is readily calculated. In order to verify and test with certainty the measuring accuracy of the indicator hands on the meters, the water in the receiving tank (not shown) is subsequently weighed and if there be discrepancy between the weight of the volume of water in the tank and the measurement of the indicator hands the same is readily detected and may be corrected.

There are a number of features which stand out prominently in connection with my improved meter testing machine in which, first, if in starting to test one or more meters I find that the indicator hand or hands on the dials of the meters are standing so as to necessitate fractional computation, I can move each indicator hand independently of the others to a point on the scale of the registering mechanism before starting the test, thereby rendering computation easy at the conclusion of the test. This I accomplish by allowing a small stream of water to escape in the rear of the meter—in the direction of the flow—to be tested. This limited flow of water which is allowed to escape operates the indicator mechanism and slowly moves the indicator hand along the scale to the desired postion after which the flow of water is discontinued. The indicator hand on each successive meter in the series to be tested is now set until all the indicator hands on the several meters are set at the desired point of starting. The above tapping of the water supply is accomplished by means of small pet-cocks, and, as an illustration, attention is directed to meter A in Fig. 1 which is placed in position to be tested. The valve 53$^a$ in the outlet pipe 54 is closed during the meter testing period. I now note the position of the indicator hand of the registering mechanism of meter A, and if said hand stands on any fractional part of the scale I open the pet-cock B and allow a small stream of water to escape. This escaping water operates the meter slowly but sufficiently to move the indicator hand and when said hand reaches the desired position over the scale the flow of water is then discontinued. In case there are several meters in the machine, I move to the next succeeding meter, in the direction of the incoming water, and inspect the indicator hand. If I find that the indicator hand is not set so as to make computation easy I open the pet-cock C which allows a small stream of water to escape and which moves the indicator hand to the desired point, and so on until all of the meters in the machine have been set to suit the operator. At the conclusion of the operation of initially setting the indicator hands on the different meters, the valve 53ª is opened, allowing the water to flow uninterruptedly through the meters. Second, in case it is desired to subject a meter to a test of handling various sized streams of water, I provide a vertical movable plate 56 having a number of various sized orifices 57 therein. This plate 56 is known as a calibrated plate, and is arranged to be moved transversely across the stream of water. This plate is best shown in Fig. 4 of the drawings, and to readily bring the various orifices 57 into line with the stream, the said plate is made adjustable so that accurate registration of the orifices in the plate with the stream is insured at all times. For convenience, I have mounted the plate 56 between the last bearing 15 of the testing machine and the elbow 58. As shown in Fig. 4, the plate 56 slides in a determined path between the lugs 56ª on the bearing 15, one edge of the plate 56 being provided with a series of notches 59 which are engaged by a suitable pawl 60 mounted on the bearing 15. By disengaging the pawl 60 from the notches 59 the calibrated plate 56 is free to be moved transversely of the flow of water, and when said pawl engages the notches 59 the plate 56 stands so as to insure one of the orifices 57 being in accurate registration with the flow of water. The orifices 57 are of different diameters, running usually from one inch downward to one thirty-second of one inch, so that the plate meets the varying conditions employed for testing meters, and as the plate 56 throttles down or enlarges the flow of water the meter test will include the passing of different volumes of water through the meters in a given time under the same head. After the calibrated plate 56 has been moved to bring the proper orifice 57 in line with the stream of water it is clamped in position by means of a hand-screw 66 which passes through a yoke 65 and bears against the elbow 58, and to prevent leakage between the calibrated plate 56 and the adjacent sides of the bearing 15 and the elbow 58, I insert suitable gaskets 63. See Fig. 5.

The machine is further provided with a pair of gages 67, one of the gages being located at a point where the water enters from the pipe 50, and the other near the opposite end of the machine, these gages being used merely for indicating the reduction of water pressure through friction by noting the existing pressure at the two points where the gages are located.

As hereinbefore stated, the machine is able to make a test of a single meter of five-eighths of an inch flow, in which case a five-eighths inch leading pipe 45 is used, and in case three-quarters inch meters are tested the five-eighths inch pipes 45 are replaced by three-quarter inch leading pipes. The machine is also capable of making a full flow test, that is to say, a meter can be tested having a capacity for accommodating the full flow of water into the machine which, in this instance, would be a one-inch flow. This is accomplished by constructing the first section of the machine of sufficient size to accommodate a meter that will take a one-inch stream of water. When such a test is to be made the valve 53ª is closed and the valve 55 is opened, allowing a free and unobstructed one-inch flow of water to pass from the pipe 50 through the meter into the pipes 69 and 70 which form a by-pass for the water in reaching the outlet pipe 54. In making this test the indicator hand of the meter may be moved around to a proper starting point by opening the pet-cock Z in the same manner as has heretofore been described. When the smaller meters are being tested the by-pass is closed by means of the valve 55, and a leading pipe 72 accommodating a full size flow of water is inserted in the position occupied by the large meter, to establish the flow of water between the inlet pipe 50 and the smaller meters A on the pipe 45, as the case may be.

I have in the beginning of this specification called attention to the fact that the machine is provided with a tank 10. The purpose of this tank is to catch such water as may escape through the pet-cocks or when the meters are being placed into position or removed, the tank preventing the water from splashing and rendering the immediate vicinity around the testing machine damp and unhealthy.

Having thus fully described my said invention, what I desire to secure by Letters Patent, is—

1. In combination, in a machine for testing a group of meters arranged in successive communication, means for independently securing each meter in operative position, and means for replacing one or more meters without disturbing the remaining meters in the group.

2. In combination, in a machine for simultaneously testing a group of meters arranged in successive communication, means for removably supporting each meter independently in operative position, means for independently securing each meter in operative position, and means for replacing one or more meters without disturbing the remaining meters in the group.

3. In combination, in a machine for testing a group of meters arranged *seriatim*, each of said meters being provided with an indicator, means for removably supporting each meter independently of the other meters in the group, means for securing each meter independently of the others in the group, and means for initially setting each meter indicator beginning at the discharge end of the machine independently of the other meter indicators in the group.

4. In combination, in a machine for testing a group of meters arranged *seriatim*, each of said meters being provided with an indicator, means for removably supporting each meter independently of the other meters in the group, means for securing each meter independently of the other meters in the group, means for initially setting each meter indicator beginning at the discharge end of the machine independently of the other meter indicators, and means for replacing one or more meters without disturbing the remaining meters in the group.

5. In combination, in a machine for testing a group of meters arranged *seriatim*, means for removably supporting independently each meter in operative position, means for securing each meter independently of the other meters, a single means for conducting the water to said meters, a single means for controlling the flow of water in the conducting means leading to the meters, a discharge means for the water, and a single means for controlling the flow of water through said discharge means.

6. In combination, with a machine for testing a group of alined meters arranged *seriatim*, means for removably mounting each meter in operative position, means for securing each meter independently of the others, and a perforated means having transverse adjustment through the stream of water for testing the meters to different volumes of water under the same head.

7. In combination, with a machine for testing a group of alined meters, means for removably mounting each meter of the group in operative position, means for securing each meter independently of the others, means having transverse adjustment through the stream of water and provided with different sized openings for increasing and decreasing the volume of water passing through the meters under a given head, and means for externally indicating the registration of each perforation in said perforated means with the stream of water.

8. In combination, with a machine for testing a group of alined meters, means for removably mounting each meter of the group in operative position, means for securing each meter independently of the others, a perforated means having transverse adjustment through the stream of water for reducing or enlarging the flow of water through the meters, means for externally indicating the registration of each perforation in said perforated means with the stream of water, and means for securing the perforated means at the different positions of its adjustment.

9. In combination, with a machine for testing a group of alined meters, a wastewater catch trough forming a means for mounting the meter supporting bearings, a plurality of hollow meter supporting bearings arranged above said trough, liners arranged within said hollow bearings and at one end projecting externally of said bearings and forming supports for one end of the meters, revoluble threaded cylinders arranged within said liners, means for rotating said cylinders, means for preventing longitudinal movement of said cylinders, threaded sleeves within the cylinders and adapted to move longitudinally when the cylinders are rotated for securing the meters in position, and means formed on the sleeves for supporting the opposite ends of the meters.

10. In combination, with a machine for testing a group of alined meters, a wastewater catch trough forming a means for mounting the meter supporting bearings, a plurality of hollow meter supporting bearings arranged above said trough, liners rigidly secured within said hollow bearings and one end of the liners projecting externally of said bearings and forming supports for one end of the meters, revoluble threaded cylinders arranged within said liners, means for rotating said cylinders, means for preventing longitudinal travel of said cylinders, threaded sleeves within said cylinders and adapted to move longitudinally when the cylinders are rotated, means formed on the sleeves for supporting the opposite ends of the meters, a perforated means having transverse adjustment through the stream of water for reducing and increasing the volumes of water through the meters under the same head.

11. In combination, with a machine for testing a group of alined meters arranged *seriatim*, means for removably securing each meter in the group in operative position, means for securing each meter independently of the others, means for conducting the water to the meters, an outlet passageway for the water, means for temporarily closing said outlet passageway before initially starting the meter test, and means for independently establishing a starting point for the reading of each meter.

12. In combination, in a machine for testing a plurality of meters arranged *seriatim*, means for removably supporting each meter independently in operative position, means for securing each meter independently in operative position, a single means for delivering water to all the meters *seriatim*, a single means for carrying the water away from the meters, and a by-pass connecting the outlet of one meter with the outlet pipe.

In witness whereof, I, have hereunto set my hand and seal at Wabash, Indiana, this 6'' day of August, A. D. one thousand nine hundred and fourteen.

EDWIN H. FORD. [L. S.]

Witnesses:
R. B. VICE,
R. W. KLARE.